United States Patent [19]

Neuman et al.

[11] Patent Number: 5,395,698
[45] Date of Patent: Mar. 7, 1995

[54] NEUTRAL, LOW EMISSIVITY COATED GLASS ARTICLES AND METHOD FOR MAKING

[75] Inventors: George A. Neuman, Pittsburgh; Royann L. Stewart-Davis, Plum Borough, both of Pa.

[73] Assignee: PPG Industries, Inc., Pittsburgh, Pa.

[21] Appl. No.: 72,792

[22] Filed: Jun. 4, 1993

[51] Int. Cl.⁶ .............................................. B32B 15/00
[52] U.S. Cl. .................................. 428/428; 428/212; 428/216; 428/336; 428/432; 428/446; 428/448; 428/697; 428/699; 428/701; 428/702; 359/359; 359/580; 359/586
[58] Field of Search ............... 428/428, 432, 446, 448, 428/697, 699, 701, 702, 336, 212, 216; 359/359, 580, 586

[56] References Cited

U.S. PATENT DOCUMENTS

| | | | |
|---|---|---|---|
| 3,378,396 | 4/1968 | Zaromb | 428/928 |
| 4,187,336 | 2/1980 | Gordon | 428/34 |
| 4,206,252 | 6/1980 | Gordon | 427/160 |
| 4,308,316 | 12/1981 | Gordon | 428/336 |
| 4,377,613 | 3/1983 | Gordon | 428/212 |
| 4,386,117 | 5/1983 | Gordon | 427/109 |
| 4,419,386 | 12/1983 | Gordon | 427/109 |
| 4,440,822 | 4/1984 | Gordon | 428/216 |
| 4,853,257 | 8/1989 | Henery | 427/166 |

*Primary Examiner*—Ellis P. Robinson
*Assistant Examiner*—Timothy M. Speer
*Attorney, Agent, or Firm*—Donna L. Seidel

[57] ABSTRACT

A coated article and method of producing it are disclosed wherein the iridescence caused by the difference between the refractive index of a transparent substrate and the refractive index of a metal oxide coating is reduced by means of two intermediate layers, the first of which, closest to the substrate, has a refractive index higher than the refractive index of the substrate but lower than the refractive index of the second, and the second has a refractive index higher than the refractive index of the first but lower than the refractive index of the metal oxide coating. The thicknesses of the two intermediate layers for optimizing a neutral appearance are determined by the thickness and refractive index of the metal oxide coating.

14 Claims, 1 Drawing Sheet

NEUTRAL, LOW EMISSIVITY COATED GLASS ARTICLES AND METHOD FOR MAKING

BACKGROUND OF THE INVENTION

1. Field of the Invention

This invention relates to a method for the chemical vapor deposition of one or more metal oxides on a substrate, e.g. glass, and to the articles, e.g. neutral low emissivity coated glass, made thereby.

2. Description of the Relevant Art

It is known in the art that when a film of a transparent metal oxide, such as tin oxide, is deposited on a glass substrate, the coated glass substrate has non-uniform light reflection across the visible spectrum because of the difference in the refractive indices of the metal oxide and the glass substrate. In addition, when the thickness of the metal oxide coating is not uniform, the coating tends to display a multiplicity of interference color effects commonly referred to as iridescence. Such iridescence effects render the coated glass aesthetically unacceptable for most architectural applications. Thus, various methods to mask such iridescence effects and/or reduce reflectance have been proposed.

One technique for minimizing or eliminating the effects of the difference between the refractive indices of a metal oxide and a glass substrate is disclosed in U.S. Pat. No. 3,378,396 to Zaromb, wherein a glass substrate is coated by simultaneously directing separate sprays of a tin chloride solution and a silicon chloride solution onto a stationary heated glass piece in an oxidizing atmosphere, e.g. air. The heat of the glass piece thermally converts the metal chlorides to their metal oxides. The ratio of the two sprays is gradually varied to vary the ratio of the weight percent of the metal oxides in the coating. The resultant coating has a continuously-changing composition throughout its thickness, e.g. near the glass-coating interface, the coating is predominantly silicon oxide, the surface of the coating farthest from the glass-coating interface is predominantly tin oxide, and between the surfaces the coating is made up of varying weight percent amounts of silicon oxide and tin oxide. U.S. Pat. Nos. 4,206,252 and 4,440,882 further teach the depositing of fluorine-doped tin oxide on a gradient coating of the type taught by Zaromb.

U.S. Pat. Nos. 4,187,336 and 4,308,316 disclose the reduction of iridescence of a tin oxide coating on a glass substrate by the use of an intermediate coating between the tin oxide coating and the glass substrate having a thickness and refractive index satisfying the optical equation: the refractive index of the intermediate coating is equal to the square root of the refractive index of the glass substrate times the refractive index of the tin oxide coating.

U.S. Pat. Nos. 4,377,613 and 4,419,386 disclose a reduction in iridescence arising from a tin oxide film on a glass substrate by providing two intermediate coating layers between the glass substrate and the tin oxide. The intermediate layer next to the surface of the glass substrate has a high refractive index, while the intermediate layer farther from the surface of the glass substrate and next to the tin oxide film has a lower refractive index.

U.S. Pat. No. 4,853,257 discloses a method and an apparatus for depositing a low emissivity film on a glass ribbon by directing metal-containing coating reactants in vapor form onto the upper surface of a glass ribbon while the glass ribbon is supported on a molten metal bath contained in a non-oxidizing atmosphere. The carrier gas, the unreacted coating composition and any decomposition by-products are removed from the coating zone by an exhaust orifice on each side of, and equidistant from, the position where the coating reactants in vapor form are directed toward the glass ribbon.

U.S. Pat. No. 4,386,117 discloses a process for depositing a mixed metal oxide coating on a glass substrate by directing a gaseous mixture onto a moving glass ribbon and then exhausting gases from the coating zone at two locations equidistant from the entry of the gaseous mixture into the coating zone.

SUMMARY OF THE INVENTION

This invention is a multilayer thin film configuration for tin oxide or other metal oxide coatings that reduces the purity of the reflected color, thereby making the coating configuration appear "neutral". Two layers are applied to the substrate prior to the application of the tin oxide or other metal oxide coating. The first layer is about 400 to 600 Angstroms thick, preferably between 450 and 550 Angstroms, and has a refractive index between about 1.66 and 1.73, preferably between 1.68 and 1.72. The second layer is about 350 to 550 Angstroms thick, preferably between 400 and 500 Angstroms, and has a refractive index between 1.76 and 1.83, preferably between 1.78 and 1.82. When these two layers are applied below a fluorine-doped tin oxide or other coating of similar refractive index, the reflected color purity is significantly reduced, thereby making the coated glass appear more like uncoated glass. The two layers may have discrete refractive indices, or the refractive indices may vary through the depth of the coating so long as the average effective refractive index is in the desired range. The specific refractive indices necessary to achieve this "neutral" effect are determined by the refractive index of the tin oxide or other coating and the refractive index of the substrate, e.g. glass, and may need to be optimized for other coatings or substrates with different refractive indices.

DESCRIPTION OF PREFERRED EMBODIMENTS

Figure 1:
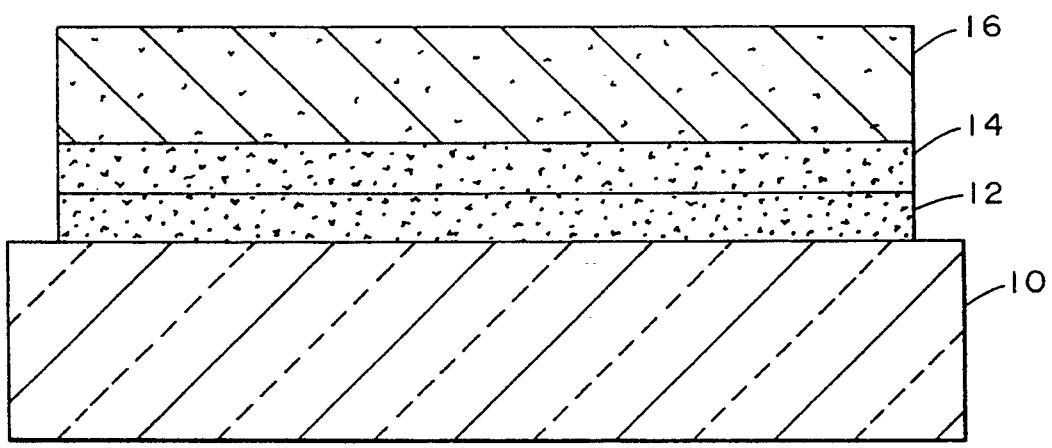
FIG. 1 illustrates a coated article in accordance with the present invention, comprising a transparent substrate 10, a first undercoat layer 12, a second undercoat layer 14, and a metal oxide coating 16.

Referring to FIG. 1, there is shown a coated article in accordance with the present invention. In general, the article includes a substrate 10, e.g. but not limiting to the invention, plastic and/or clear or colored glass, having a metal oxide coating 16 that preferably has an emissivity lower than the uncoated substrate, and exhibits minimum reflected color as a result of the two undercoat layers 12 and 14. In the following discussion, the substrate is a glass substrate. The coating 16, in general, is composed of a metal oxide, such as titanium, vanadium or zirconium oxide, preferably tin oxide.

The coated article of FIG. 1 may be produced using a coating method and apparatus as described in U.S. application Ser. No. 08/017,930, now U.S. Pat. No. 5,356,718, the disclosure of which is incorporated herein by reference.

In general, and not limiting to the invention, a glass ribbon has a thickness range from about 0.08 inch to about 0.50 inch (about 2 to about 13 millimeters) and moves at speeds of about 700 to about 100 inches (about 17.80 meters to about 2.54 meters) per minute, respectively. A molten tin bath on which the glass ribbon is supported has a temperature in the range of about 1000° F. (538° C.) to about 2000° F. (1094° C.).

The coating station for depositing a tin oxide film over the two undercoat layers is preferably of the type disclosed in U.S. Pat. No. 4,853,257, the disclosure of which is incorporated herein by reference. The flows of nitrogen and coating vapor are preferably about 350 to about 700 standard liters per minute (SLPM). The exhaust flow is preferably about 375 to about 770 SLPM. The glass ribbon speeds are between about 200 and 700 inches (5.08 to 17.78 meters) per minute, the temperature of the glass ribbon moving into, through and out of the coating stations is preferably between about 1170° and 1250° F. (635° to 675° C.).

In the following discussion, the two undercoat layers 12 and 14 are each made from a different mixture of tin-containing precursors and silicon-containing precursors capable of being volatilized and converted to their corresponding oxides in the presence of oxygen at temperatures in the range of about 750° F. to about 1500° F. (about 400° C. to about 815° C.). As will be appreciated, the invention is not limited thereto, and other metal-containing precursors may be used with the coating apparatus and in the coating processes discussed herein.

Examples of silicon compounds that may be used in the practice of the invention include, but are not limited to, tetraethoxysilane, silane, diethylsilane, di-t-butoxydiacetoxysilane and the silicon compounds disclosed in U.S. Pat. No. 3,378,396 to Zaromb and U.S. Pat. Nos. 4,187,336, 4,308,316, 4,377,613, 4,419,386, 4,206,252, 4,440,822, and 4,386,117, which are incorporated herein by reference. Compounds that have been used in the practice of the invention include diethylsilane, tetramethoxysilane, tetraethoxysilane, tetraisopropoxysilane, diethyldichlorosilane, tetramethylcyclotetrasiloxane and triethoxysilane. In addition to the silicon-containing precursors discussed above, the invention contemplates silicon-containing precursors that can be converted to their corresponding silicon oxides and can be used in admixture with the metal-containing precursors to form the desired undercoat layer on the substrate, e.g. a glass substrate, i.e. a mixed oxide undercoat layer with an oxide ratio suitable to produce the desired refractive index.

When looking for a silicon-containing precursor to form a silicon oxide coating, one skilled in the art would not normally choose a precursor having an Si—O bond because it is one of the strongest bonds in nature to break, as is evidenced by the stability of the mineral quartz (SiO$_2$). Therefore, breaking the Si—O bond in the precursor and rearranging it into a network lattice containing the silicon oxide bonds desired for a coating is difficult, e.g. the siloxane bond requires high temperature and/or long periods of time to form a corresponding silicon oxide coating. For this reason, silicon-containing precursors having the siloxane structure would not be expected by one skilled in the art to be useful in the formation of a silicon oxide coating on a moving substrate.

It has been determined, however, that if a compound carrying an Si—O bond also carries at least one specific functional group, the reactivity of the silicon-containing precursor having the Si—O bond, and therefore its coating formation rate, will be increased, even though the bond strengths would not seem to indicate any appreciable change in its coating formation behavior. The functional groups that are capable of giving the silicon-containing precursor containing an Si—O bond the ability to be easily converted to a silicon oxide coating include hydrogen, halogens, vinyls and α-chlorinated alkyls. The reactivity of the silicon-containing precursor can then be tailored by the appropriate choice of functional groups. The silicon-containing precursor is not limited to having only the above-defined substituents thereon. As long as one or more of the above-defined functional groups is present on the silicon-containing precursor carrying the Si—O bond, other groups, such as alkyls and other substituents more fully defined below, can also be present without a significant deleterious effect on the overall reactivity of the silicon-containing precursor. Suitable compounds are described in detail in U.S. Ser. No. 08/017,930, now U.S. Pat. No. 5,356,718, the disclosure of which has been incorporated by reference herein.

Specific compounds that have been used in the practice of the invention include tetramethylcyclotetrasiloxane, tetramethyldisiloxane and triethoxysilane. Specific compounds that may be used in the Practice of the invention, but not limiting thereto, are methyldimethoxysilane, dimethylmethoxysilane, trimethoxysilane, dtmethylchloromethoxysilane, methylchlorodimethoxysilane, chlorotrimethoxysilane, dichlorodimethoxysilane, trichloromethoxysilane, triethoxysilylacetylene, trimethylpropynylsilane, tetramethyldisiloxane, tetramethyldichlorodisiloxane, tetramethylcyclotetrasiloxane, triethoxysilane, chlorotrtethoxysilane, pentachloroethyltriethoxysilane and vinyltriethoxysilane.

Metal-containing precursors that can be used in admixture with the silicon-containing precursors defined above in the chemical vapor deposition of mixed oxides on a glass substrate include metal-containing precursors that are vaporizable at or below about 500° F. (260° C.) and that will react with an oxygen-containing gas to form the corresponding metal oxides. Preferably, but not limiting to the invention, compounds that may be used include organometallic compounds containing metals including, but not limited to, titanium, vanadium, chromium, manganese, iron, cobalt, nickel, copper, zinc, gallium, germanium, arsenic, selenium, yttrium, zirconium, niobium, molybdenum, cadmium, rhodium, ruthenium, palladium, indium, antimony, tellurium, tantalum, tungsten, platinum, lead, bismuth, aluminum, and tin. Of these metal compounds, tin compounds are most preferred. Examples of tin compounds useable herein include those defined by the following structural formula II:

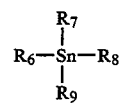

$$\begin{array}{c} R_7 \\ | \\ R_6-Sn-R_8 \\ | \\ R_9 \end{array} \qquad \text{II}$$

wherein $R_6$, $R_7$, $R_8$, and $R_9$ may be the same or different and include, but are not limited to, halogens, preferably Cl or F, an alkyl radical having from 1 to 10, preferably 1 to 4, carbon atoms, such as —CH$_3$, an aryl group having from 6 to 11, preferably 6 to 9, carbon atoms, such as —C$_6$H$_5$. In the practice of the invention, any other organic or inorganic functional group can be used provided the vapor pressure of the resultant compound is at least 0.01 pounds per square inch absolute, below about 500° F. (260° C.).

The silicon-containing precursors defined above, including those bearing the Si—O bond, can be used alone, or they can be used in admixture with the organometallic compounds discussed above in the chemical vapor deposition of the corresponding single or mixed oxides on a glass substrate. However, when the silicon-containing precursor is used alone, or in admixture with other metal-containing precursors, in the chemical vapor deposition of single or mixed oxides onto a moving substrate, e.g. coating a ribbon of glass advancing along a molten metal bath or on a conveyor, it is desirable to have a rate of silicon oxide deposition sufficient to coat the moving glass substrate. For example, when coating an advancing glass ribbon, if the deposition rate of silicon oxide is relatively low, the glass ribbon speed has to be reduced. More particularly, to deposit about a 1200 Angstrom thick coating on a glass ribbon moving at a line speed of greater than about 300 inches (7.62 meters) per minute, the rate of deposition of all classes of silicon-containing precursors used in the chemical vapor deposition processes is preferably increased to attain a uniform coating.

A number of materials have been identified that can be used to accelerate the deposition rate of silicon oxides from their precursors. The type and functionality of each accelerant depends to some extent on the silicon-containing precursors with which it will be used. Combinations have been determined for a specific coated article and for the process used to deposit the desired coating, in particular, the mixed oxides of the invention. It has further been determined that a synergistic effect occurs between certain combinations of precursors and accelerants that results in a beneficial altering and control of the morphology of the coating.

Accelerants that can be used in the practice of the invention to increase the deposition rate of silicon oxide alone or in combination with another oxide, for example, tin oxide, can be defined as follows:

(1) Lewis Acids, such as trifluoroacetic acid and hydrochloric acid.

(2) Lewis Bases, such as NaOH, NaF, $CH_3OH$, $CH_3OCH_3$ and $S(CH_3CH_2)_2$.

(3) Water.

(4) Compounds of nitrogen, phosphorus, boron, and sulfur having the following structural formulae:

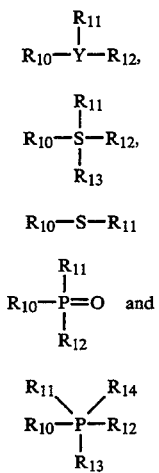

wherein Y is selected from the group consisting of nitrogen, boron and phosphorus and $R_{10}$, $R_{11}$, $R_{12}$, $R_{13}$ and $R_{14}$ are selected from the following list of functional groups, hereinafter referred to as Group F:

hydrogen;

halogens, preferably Cl;

alkenyl or substituted alkenyl radicals having from 2 to 10, preferably 2 to 4, carbon atoms, such as $-CH=CH_2$;

perhalogenated alkyl or substituted alkyl radicals having from 1 to 10, preferably 1 to 4, carbon atoms, such as $-CClH_2$ or halogenated alkyl or substituted alkyl radicals having from 1 to 10, preferably 1 to 4, carbon atoms, such as $-CCl_2CH_2CH_3$;

acyloxy radicals having from 1 to 10, preferably 1 to 4, carbon atoms, such as $-OCOCH_3$;

alkynyl or substituted alkynyl radicals having from 2 to 10, preferably 2 to 4, carbon atoms, such as $-C\equiv CH$;

alkyl or substituted alkyl radicals having from 1 to 10, preferably 1 to 4, carbon atoms, such as $-CH_3$, $-CH_2CH_2CH_3$;

aryl or substituted aryl radicals having from 6 to 10, preferably 6 to 9, carbon atoms, such as $-C_6H_4CH_3$;

alkoxide or substituted alkoxide radicals having from 1 to 10, preferably 1 to 4, carbon atoms, such as $-OCH_2CH_2CH_3$;

wherein said substituents are from Group E discussed above, examples of which compounds include but are not limited to triethylphosphite, trimethylphosphite, trimethylborate, $PF_5$, $PCl_3$, $PBr_3$, $PCl_5$, $BCl_3$, $BF_3$, $(CH_3)_2BBr$, $SF_4$ and $HO_3SF$. In the practice of the invention triethylphosphite has been used.

(5) Compounds of aluminum having the following structural formula III may be used to accelerate the deposition rate of silicon-containing precursors alone or in combination with other metal-containing precursors (the "other metal-containing precursors", as can be appreciated, do not include aluminum-containing precursors):

wherein $R_{15}$, $R_{16}$, and $R_{17}$ are the same or different and are selected from the following Group G:

hydrogen;

halogens, preferably Cl;

$-O-R_{17}$, wherein $R_{17}$ is a linear, branched or substituted alkyl radical having from 1 to 10 carbon atoms, preferably 1 to 4, with substituents selected from Group E discussed above;

$-S-R_{18}$, where $R_{18}$ is equivalent to $R_{17}$ defined above;

$-NH_2$;

$R_{19}-N-R_{20}$, wherein $R_{19}$ and $R_{20}$ are linear or branched alkyl groups, or substituted alkyl groups having from 1 to 10, preferably 1 to 4, carbon atoms, with substituents selected from Group E discussed above (less the phosphine groups, such as $-PH_2$); and $N R_{21}$, wherein $R_{21}$ forms cyclic group having from 2 to 10 preferably 2 to 6 carbon atoms, with substituents selected from Group E discussed above (less the phosphine groups).

(6) Ozone.

The mechanism that causes the accelerants of the invention to increase the rate of deposition is not completely understood. The amounts of the components that may be used in the practice of the invention are defined below in Table 1.

TABLE 1

| Compound | Mole Percent | |
|---|---|---|
| | Broad Range | Preferred Range |
| Metal-Containing Precursor | 0.005 to 5.0 | 0.1 to 2.0 |
| Silicon-Containing Precursor | 0.0001 to 5.0 | 0.05 to 2.0 |
| Oxygen-Containing Gas | 1.0 to 99.0 | 5.0 to 50.0 |
| Accelerant | 0.0001 to 10.00 | 0.01 to 2.0 |

When the substrate 10 (see FIG. 1), e.g. a glass substrate, is subjected to chemical vapor deposition of mixed oxides, for example, a mixture of silicon oxide and tin oxide, to obtain the two undercoat layers 12 and 14 thereon in accordance with the process of the invention, the coating 16 is characterized by exhibiting a substantial reduction of iridescence in the coated product. With the two undercoat layers comprising substantially silicon oxide and tin oxide, the first undercoat layer 12 adjacent to the glass comprises a higher proportion of silicon oxide to tin oxide than the second undercoat layer, which has a higher proportion of tin oxide in order to obtain a higher refractive index. The first undercoat layer preferably has a refractive index between about 1.66 and 1.73, most preferably between about 1.68 and 1.72, with a thickness in the range of 400 to 600, preferably 450 to 550, Angstroms. The second undercoat layer preferably has a refractive index between about 1.76 and 1.83, more preferably between about 1.78 and 1.82, with a thickness in the range of 350 to 550, preferably 400 to 500, Angstroms. The thickness of the metal oxide coating 16, preferably tin oxide, is at least about 1600 Angstroms. Thereafter, the thickness of the tin oxide coating 16 may be increased to reduce the emissivity of the coated article. A preferred thickness range for the tin oxide coating 16 is from about 2600 to 3600 Angstroms, more preferably 3000 to 3400, most preferably about 3200, Angstroms. The tin oxide coating 16 is preferably doped with fluorine to optimize emissivity for any given thickness.

It has been determined that when chemical vapor deposition of mixed oxides on a glass substrate is carried out with the addition of one or more of the accelerants of the instant invention, e.g. compounds of phosphorus, aluminum, or boron? a small amount of the foundation atom, e.g. phosphorus, aluminum or boron, is found dispersed in the coating. The presence of phosphorus, aluminum and/or boron in the coating affects the morphology of the resultant coating by decreasing the crystallinity (approaching zero percent crystallinity), thereby reducing the light scattering properties which can be observed as haze. The amount of phosphorus, aluminum or boron incorporated in the layer is a function of process variables. In the practice of the invention, a glass ribbon moving at speeds between 175 to 730 inches (4.25 to 18 meters) per minute, and having a temperature in the range of 1180° F. (637° C.) to 1220° F. (660° C.) was coated with a gaseous mixture having a phosphorus compound as an accelerant; the mole fraction of the accelerant was 0.01 to 0.5. One to 12 atomic percent of phosphorus was found dispersed in the coating. The invention encompasses using an amount of accelerant greater than 0 and up to 15 atomic percent, with a preferred range of 1 to 5 atomic percent.

The coated articles of the following examples were produced on a moving glass ribbon using a process and an apparatus as described in U.S. Ser. No. 08/017,930, now U.S. Pat. No. 5,356,718, the disclosure of which has been incorporated herein by reference. In this process, the glass passed under two coaters. The first coater had two coating zones that deposited two coating layers, each comprising a mixture of tin oxide and silica, and each having the appropriate respective refractive index and thickness. The second coater deposited a coating of fluorine-doped tin oxide on top of the two layers of mixed tin and silicon oxides. The fluorine-doped tin oxide coatings in the following examples were deposited in accordance with the teachings of U.S. Pat. No. 4,853,257.

The silicon-containing and metal-containing precursors that were used to deposit the mixed tin and silicon oxides of the following examples were monobutyltintrichloride and tetraethoxysilane. Water and triethylphosphite were used as accelerants. The first coating zone of the first coater deposited a mixed oxide coating composed of tin oxide and silica. Phosphorus was also included in the composition of the film as a result of its role as a deposition rate accelerator. The second coating zone of the first coater deposited a mixed oxide, again of tin oxide and silica, but with a higher proportion of tin oxide and a correspondingly higher refractive index. The refractive indices and thicknesses of the coating layers of mixed tin and silicon oxides were determined by Variable Angle Spectroscopic Ellipsometry (VASE) of coating layers deposited separately on glass. The refractive indices and thicknesses of the mixed tin and silicon oxides in the multilayer coated article were statistically adjusted using the data from the coating layers produced and analyzed separately on glass. The color saturation index was determined using the procedure of Hunter. The equation ($\sqrt{a^{*2}+b^{*2}}$) usually used by those skilled in the art to quantify the observability of color of an object is discussed by Hunter in *Food Technology*, Vol. 32, pages 100–105, 1967 and in *The Measurement of Appearance*, Wiley and Sons, New York, 1975. A coated glass product having a Hunter value of 12 or less is considered to exhibit no appreciable observable color. All of the following examples had a color saturation index well below the threshold of 12.

The present invention will be further appreciated and understood from the description of specific examples which follow:

EXAMPLE I

A glass substrate 0.19 inch (4.8 millimeters) thick at a temperature of about 1215° F. (about 657° C.), was contacted in sequence with coating reactants in vapor form in carrier air to deposit three coating layers in accordance with the present invention. A first reactant vapor mixture of silicon-containing coating reactant, 0.6 mole percent tetraethoxysilane (TEOS), and tin-containing coating reactant, 0.271 mole percent monobutyltinchloride (MBTC), at a vapor temperature of 268° F. (181° C.), was thermally reacted on the glass surface. The first mixture additionally comprised 0.201 mole percent water and 0.241 mole percent triethylphosphate (TEP) accelerant to form on the glass surface a first silicon oxide/tin oxide coating layer having a refractive index of 1.663 and a thickness of 540 Angstroms. A second reaction vapor mixture of silicon-containing coating reactant, 0.448 mole percent TEOS, and tin-containing coating reactant, 0.401 mole percent MBTC, at a vapor temperature of 271° F. (133° C.), was thermally reacted on the first coating layer. The second mixture further comprised 0.375 mole percent water and 0.132 mole percent TEP accelerant to deposit a second silicon oxide/tin oxide coating layer having a refractive index of 1.795 and a thickness of 450 Angstroms. Finally, a fluorine-doped tin oxide coating 3055 Angstroms thick was deposited from a vapor mixture of monobutyltin-chloride and trifluoroacetic acid. The final coated article had an emissivity of 0.212 and a color saturation index of 5.90.

EXAMPLE II

A coated article was prepared as in Example I, except as follows. The glass substrate was 0.13 inch (3.3 millimeters) thick and the surface temperature was 1222° F. (661° C.). In the first mixture, the TEOS concentration was 0.333 mole percent, the MBTC concentration was 0.284 mole percent, the TEP concentration was 0.417 mole percent, the water concentration was 0.803 mole percent, and the vapor temperature was 258° F. (126° C.). In the second mixture, the TEOS concentration was 0.59 mole percent, the MBTC concentration was 0.763 mole percent, the TEP concentration was 0.169 mole percent, the water concentration was 0.703 mole percent, and the vapor temperature was 257° F. (125° C.). The first silicon oxide/tin oxide layer had a refractive index of 1.675 and a thickness of 475 Angstroms. The second silicon oxide/tin oxide layer had a refractive index of 1.786 and a thickness of 450 Angstroms. The fluorine-doped tin oxide coating had a thickness of 2815 Angstroms. The emissivity of the coated article was 0.225, and the color saturation index was 4.00.

EXAMPLE III

A coated article was prepared as in Example I, except as follows. The glass substrate was the same thickness as in Example II, and the surface temperature was 1219° F. (659° C.). In the first vapor mixture, the concentrations were 0.336 mole percent TEOS, 0.279 mole percent MBTC, 0.404 mole percent TEP, 0.802 mole percent water, and the vapor temperature was 287° F. (142° C.). In the second vapor mixture, the concentrations were 0.579 mole percent TEOS, 0.765 mole percent MBTC, 0.16 mole percent TEP, 0.703 mole percent water, and the vapor temperature was 270° F. (132° C.). The first silicon oxide/tin oxide layer had a refractive index of 1.685 and a thickness of 507 Angstroms. The second silicon oxide/tin oxide layer had a refractive index of 1.801 and a thickness of 441 Angstroms. The fluorine-doped tin oxide coating had a thickness of 3030 Angstroms. The coated article had a color saturation index of 5.80 and an emissivity of 0.218.

Although several embodiments of the present invention have been described and illustrated, it will be apparent to those skilled in the art that various changes and further modifications may be made therein without departure from the spirit of the invention or from the scope of the appended claims.

We claim:

1. A neutral, low emissivity coated article comprising:
   a. transparent substrate having a refractive index in the range of about 1.5 to 1.6;
   b. a first transparent coating layer having a refractive index in the range of about 1.66 to 1.73 and a thickness in the range of about 400 to 600 Angstroms;
   c. a second transparent coating layer having a refractive index in the range of about 1.76 to 1.83 and a thickness in the range of about 350 to 550 Angstroms; and
   d. a metal oxide coating layer having a refractive index of at least 1.86 and a thickness sufficient to lower the emissivity of the coated substrate below the emissivity of the uncoated substrate.

2. An article according to claim 1, wherein the metal oxide coating layer is tin oxide.

3. An article according to claim 2, wherein the tin oxide is doped with fluorine to reduce the emissivity of the coated article.

4. An article according to claim 3, wherein the thickness of the tin oxide coating is at least 1600 Angstroms.

5. An article according to claim 4, wherein the thickness of the tin oxide coating is in the range of about 2600 to 3600 Angstroms.

6. An article according to claim 5, wherein the thickness of the tin oxide is in the range of 3000 to 3400 Angstroms.

7. An article according to claim 1, wherein the first transparent coating layer has a refractive index in the range of about 1.68 to 1.72.

8. An article according to claim 7, wherein the first transparent coating layer has a thickness in the range of about 450 to 550 Angstroms.

9. An article according to claim 1, wherein the second coating layer has a refractive index in the range of about 1.78 to 1.82.

10. An article according to claim 9, wherein the second coating layer has a thickness in the range of about 400 to 500 Angstroms.

11. An article according to claim 1, wherein the first transparent coating layer comprises a mixture of silicon oxide and tin oxide.

12. An article according to claim 1, wherein the second transparent coating layer comprises a mixture of silicon oxide and tin oxide.

13. An article according to claim 1, wherein the first and second transparent coating layers comprise a mixture of silicon oxide and tin oxide.

14. An article according to claim 13, wherein the metal oxide coating layer is tin oxide.

* * * * *